United States Patent [19]

Benzoni et al.

[11] Patent Number: 5,259,054

[45] Date of Patent: Nov. 2, 1993

[54] SELF-ALIGNED OPTICAL SUBASSEMBLY

[75] Inventors: Albert M. Benzoni, Lower Macungie Township, Lehigh County; Mindaugas F. Dautartas, Alburtis, both of Pa.

[73] Assignee: AT&T Bell Laboratories, Murray Hill, N.J.

[21] Appl. No.: 819,252

[22] Filed: Jan. 10, 1992

[51] Int. Cl.$^5$ .............................................. G02B 6/42
[52] U.S. Cl. ...................................... 385/89; 385/76; 385/77; 385/92
[58] Field of Search ................. 385/59, 76, 77, 89, 385/92

[56] References Cited

U.S. PATENT DOCUMENTS

| 4,373,778 | 2/1983 | Adham | 385/89 |
| 4,730,198 | 3/1988 | Brown et al. | 385/89 |
| 4,779,946 | 10/1988 | Pimpinella et al. | 385/88 |
| 4,812,002 | 3/1989 | Kato et al. | 385/33 |
| 4,826,272 | 5/1989 | Pimpinella et al. | 385/92 |
| 4,945,400 | 7/1990 | Blonder et al. | 385/15 |
| 4,995,695 | 2/1991 | Pimpinella et al. | 385/49 |
| 5,082,346 | 1/1992 | Myers | 385/54 |
| 5,093,879 | 3/1992 | Bregman et al. | 385/93 |
| 5,179,609 | 1/1993 | Blonder et al. | 385/89 |
| 5,182,782 | 1/1993 | Tabasky et al. | 385/89 |

FOREIGN PATENT DOCUMENTS 0305112 3/1989 European Pat. Off. .
0398575 11/1990 European Pat. Off. .
WO87/01465 3/1987 PCT Int'l Appl. .

*Primary Examiner*—Frank Gonzalez
*Attorney, Agent, or Firm*—Wendy W. Koba

[57] ABSTRACT

An optical subassembly is disclosed which provides self-alignment between an active optical device and associated optical elements. In particular, the subassembly comprises a first substrate member which is utilized to support the active optical device. A separate plurality of substrate members is used to form a support for the associated optical elements (i.e., fiber, coupling lens or both), where the separate members are stacked, one on top of the other, and an aperture through the center thereof utilized to support the optical elements. The aperture may be formed to include a mechanical stop suitable for fixing the location of an optical fiber endface. Alignment fiducials formed on the device support member and the stack provide self-alignment therebetween, as well as physical attachment of the support member to the stack. The various substrate members may comprise any suitable material including, but not limited to, silicon, metal, or molded plastic.

31 Claims, 5 Drawing Sheets

SELF-ALIGNED OPTICAL SUBASSEMBLY

BACKGROUND OF THE INVENTION

1. Technical Field

The present invention relates to an optical subassembly and, more particularly, to an optical subassembly which provides alignment between an active optical device and associated optical elements.

2. Description of the Prior Art

In the realm of optical device packaging, there is beginning to develop a number of assemblies which utilize a single crystal semiconductor material (such as silicon) as the support structure for the various optical devices. Often referred to as "silicon optical bench" technology, the utilization of silicon may result in a significant cost saving in optical packaging over some of the more esoteric materials which have been used in the past. More importantly, silicon processing technology has advanced to the stage where a number of relatively standard procedures (e.g., oxidation, metallization, etching—isotropic or anisotropic) may be utilized to facilitate attachment of the devices to the support member, as well as alignment therebetween. Further, it is possible to form optical waveguiding structures directly in/on a silicon substrate, resulting in the ability to form a completely operable optical subassembly in silicon.

An exemplary utilization of silicon in the formation of a subassembly for optoelectronic devices is disclosed in U.S. Pat. No. 4,945,400 (Blonder et al.) issued Jul. 31, 1990 and assigned to the assignee of record in this application. In general, Blonder et al. disclose a subassembly including a semiconductor (e.g., silicon) base and lid including a variety of etched features (e.g., grooves, cavities, alignment detents) and metallization patterns (e.g., contacts, reflectors) which enable the optoelectronic device to be reliably and inexpensively mounted on the base and coupled to a communicating optical fiber. In particular, Blonder et al. disclose an arrangement wherein the optoelectronic device (e.g., LED) is disposed within a cavity formed by a lid member and the communicating fiber is positioned along a groove formed in a base member. A reflective metallization is utilized to optically couple the device to the fiber. Therefore, positioning of the device over the reflector is the only active alignment step required to provide coupling. Any remaining alignments are accomplished utilizing fiducial features formed in the base and lid members.

Although the Blonder et al. subassembly represents a significant advance in the field of silicon optical bench packaging, a need remains for providing an arrangement which does not require active alignments. In particular, the provision of a completely passive optical packaging arrangement is considered both more reliable and less expensive than virtually any alternative requiring active alignment between components.

SUMMARY OF THE INVENTION

The problems remaining in the prior art are addressed by the present invention which relates to an optical subassembly and, more particularly, to an optical subassembly which provides alignment between an active optical device and associated optical elements.

In a preferred embodiment of the present invention, an optical subassembly comprises a first substrate member, used to support an active semiconductor optical device, and a plurality of separate substrate members, disposed to form a stack, where each member has been fabricated to include a viahole through its complete thickness. An optical fiber may then be inserted through the aperture formed by the stack of viaholes. Alignment between the active optical device and the optical fiber may be achieved by including alignment fiducials on the adjacent surfaces of the optical device support member and the fiber stack.

In one arrangement of practicing the present invention, the alignment fiducials may comprise detents formed in the adjacent surfaces, with spherical members inserted between the detents to provide mechanical mating.

In one embodiment of the present invention, the stack may be formed to include support for a spherical lens, disposed either on the top surface of the stack, or within the aperture created by the viahole alignment. The optical device support member may be formed to include a recess below its top major surface such that the active optical device may be positioned in the recess.

When utilizing silicon substrate members to form a fiber stack, an exemplary fabrication process may be employed to form a mechanical stop within a viahole for the fiber endface. The process utilizes oxide growth and etch steps to form the mechanical stop at a predetermined location within the stack.

It is an advantage of the present invention that the substrate members may be formed utilizing any suitable material including, but not limited to, silicon, metal, an injection- or transfer-molded plastic, or any suitable combination thereof (e.g., a silicon optical device support member and an injection-molded plastic stack).

Other and further advantages of the present invention will become apparent during the course of the following discussion and by reference to the accompanying drawings.

BRIEF DESCRIPTION OF THE DRAWING

Referring now to the drawings, where like numerals represent like parts in several views.

DETAILED DESCRIPTION

Figure 1:
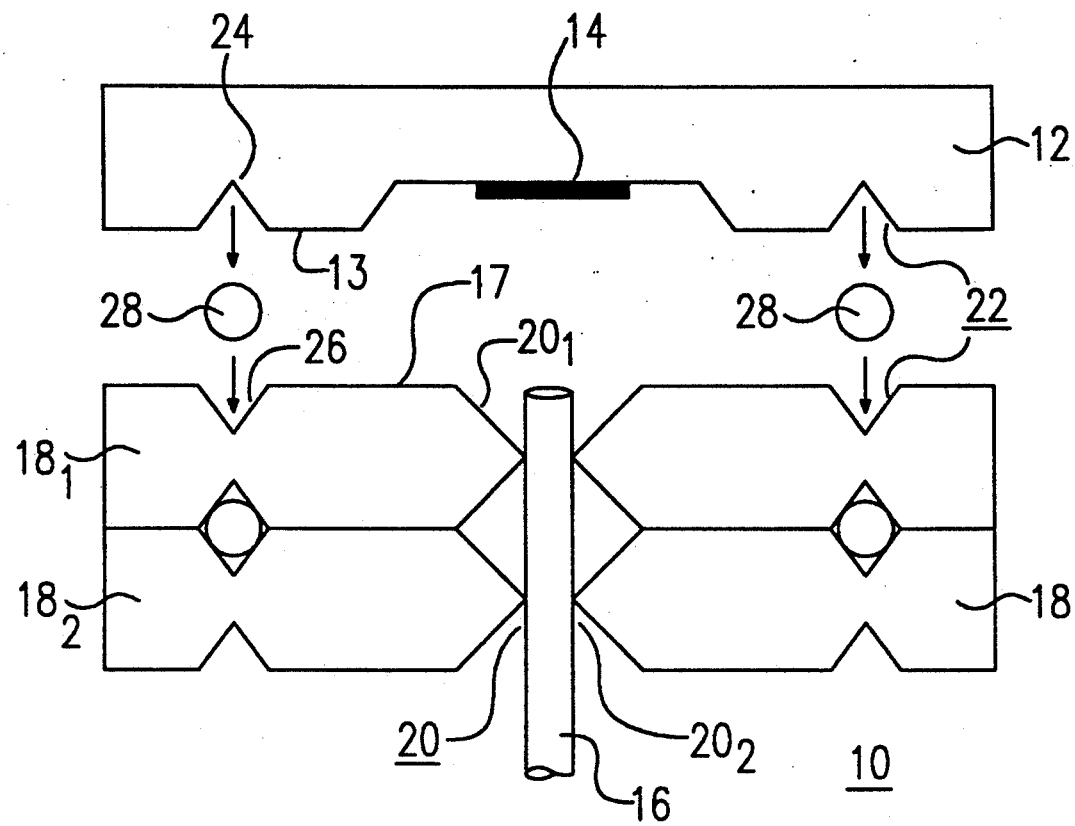
FIG. 1 illustrates an exemplary optical subassembly formed in accordance with the teachings of the present invention.

FIG. 1 illustrates, in an exploded view, an exemplary optical subassembly 10 formed in accordance with the teachings of the present invention. As shown, optical subassembly 10 comprises a first member 12 which is utilized as the support member for an active semiconductor optical device 14. An optical fiber 16 is illustrated in FIG. 1 as being coupled to optical device 14. In accordance with the teachings of the present invention, optical fiber 16 is mechanically supported by a stack of members 18, disposed as shown in FIG. 1. Exemplary optical subassembly 10 utilizes a pair of members $18_1$ and $18_2$ to form stack 18. Optical fiber 16 is inserted through an aperture 20 within stack 18, where aperture 20 comprises a pair of viaholes $20_1$ and $20_2$ formed completely through each member $18_1$ and $18_2$, respectively.

Stack 18 is aligned with, and mated to, support member 12 by a plurality of alignment fiducials 22. In the exemplary embodiment of optical subassembly 10, alignment fiducials 22 comprise a first plurality of detents 24 formed in surface 13 of member 12 and a second plurality of detents 26 formed in surface 17 of stack 18, where detents 26 are formed to align with associated detents 24. A plurality of spherical members 28 are disposed between first plurality 24 and second plurality 26 to provide mechanical attachment between support member 12 and stack 18. Therefore, since the detents are accurately formed in a pattern predetermined to provide the required alignment, optical fiber 16 will be self-aligned to active optical device 14 when stack 18 is fixed to support 12, as indicated by the directional arrows in FIG. 1.

Figure 2:
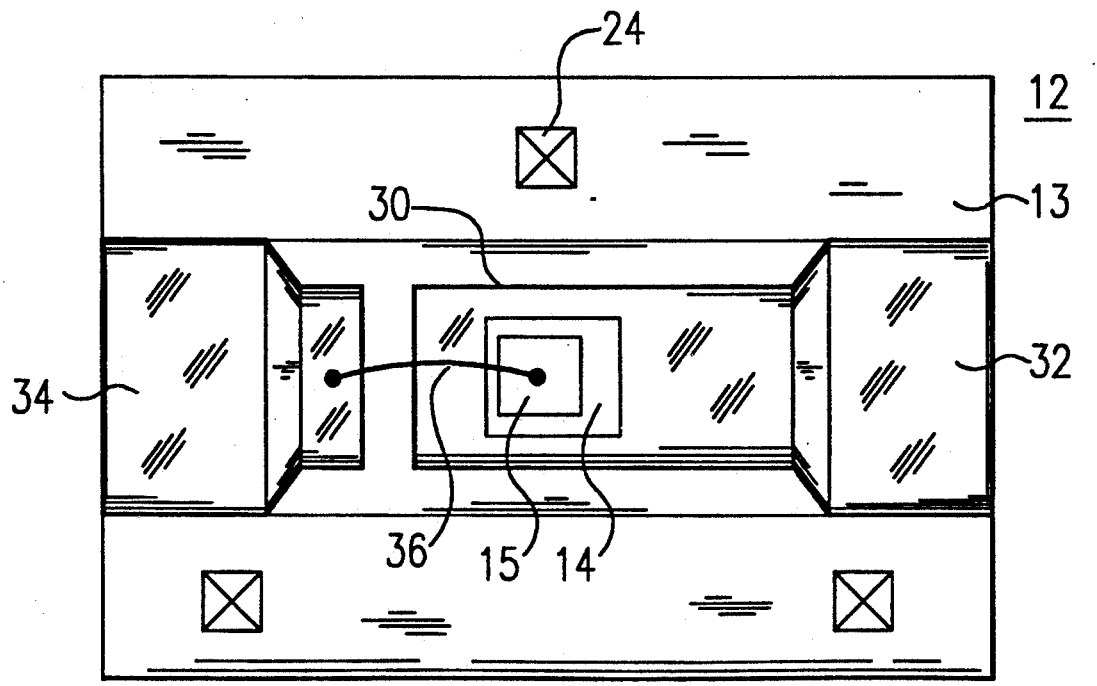
FIG. 2 illustrates a plan view of an exemplary optical device support member.

A plan view of an exemplary optical device support member 12 is shown in FIG. 2. In this particular embodiment, optical device 14 is illustrated as disposed within a recess 30 (see FIG. 3) formed in top surface 13 of member 12. Alternatively, optical device 14 may simply be attached to the planar top surface 13 of support member 12. A first metal layer 32 is formed on surface 13 and coupled to device 14 to provide a first electrical contact to the optical device. A second metal layer 34 is formed to provide the remaining contact. A wirebond 36 is used to provide the electrical connection between metal layer 34 and the top side 15 of optical device 14. Subsequent to the formation of metal layers 32,34, a leadframe section (not shown) may be attached to metal layers 32,34 of support member 12 to provide the final electrical leads associated therewith.

A set of three alignment fiducials 24, in the form of pyramidal detents, are illustrated in exemplary support member 12 of FIG. 2, where the detents are arranged such that a stable mechanical attachment is achieved. It is to be understood that any suitable number of such alignment fiducials, including kinematic designs, may be utilized when practicing the present invention.

Figure 3:
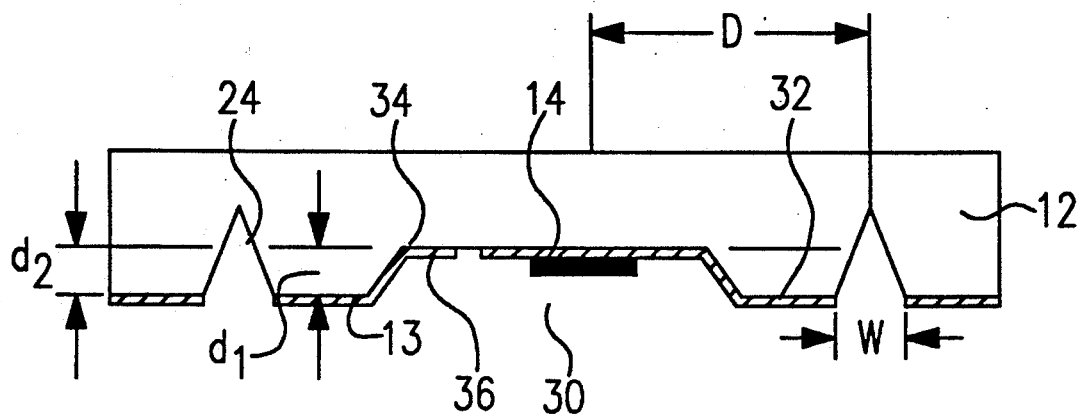
FIG. 3 illustrates a selected cross-section view of the member of FIG. 2.

FIG. 3 contains a selected cross-section view in perspective of exemplary support member 12 as depicted in FIG. 2. Shown in particular in this view is exemplary recess 30, formed to a predetermined depth $d_1$ below surface 13 of member 12. Depth $d_1$ may be chosen such that optical device 14, upon subsequent attachment, remains fully recessed below surface 13. Detents 24 are shown as formed to include a surface width w and a depth $d_2$ sufficient to accommodate an alignment sphere of known proportions. When utilizing silicon in the formation of member 12, recess 30 and detents 24 may be formed by etching, using appropriate masking of top surface 13. Alternatively, when utilizing a plastic, these features may be included in the mold, or formed as a secondary operation upon the molded piece part. In accordance with the self-aligning feature of the present invention, exemplary alignment fiducials 24 are formed at a predetermined distance D from the center of recess 30. Optical device 14 may then be accurately positioned within recess 30, with respect to first metal layer 32, as discussed in detail in U.S. Pat. No. 5,179,609, issued Jan. 12, 1993. As described therein, a liquified amount of solder will conformally coat the underlying pattern of first metal layer 32. The surface tension of the liquid material will cause the optical device to center itself and thus become aligned with metal layer 32. Therefore, by the appropriate choice of distance D and the subsequent coaxial placement of the associated stack alignment fiducials (see FIG. 4), optical alignment will be achieved.

Figure 4:
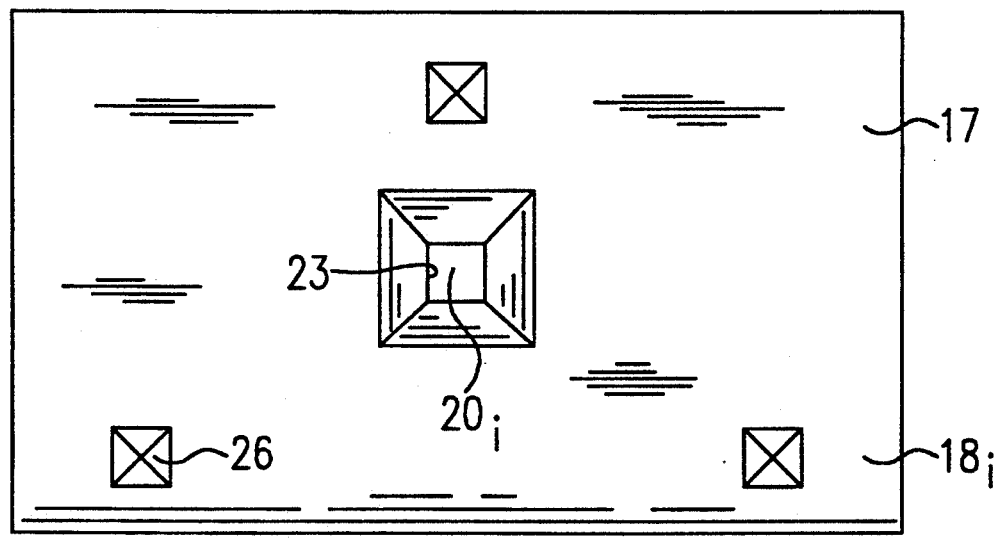
FIG. 4 illustrates a plan view of exemplary member utilized to form the stack.

A plan view of an exemplary stack member $18_i$ is illustrated in FIG. 4. A viahole $20_i$ is shown as being formed completely through member $18_i$. When utilizing silicon as the member, both the top surfaced 17 and bottom surface 19 (visible in FIG. 5) may be etched to form the viahole. The utilization of a conventional anisotropic etchant (EDP or KOH, for example) may result in the formation of an unwanted knife-edge 23 (see FIG. 5) within viahole $20_i$. However, such an etch may be required to form the desired physical design of the alignment detents. A set of three such exemplary detents 26 are illustrated as formed in top surface 17 of member $18_i$, where detents 26 are formed to align with detents 24 of member 12 upon mating.

Figure 5:
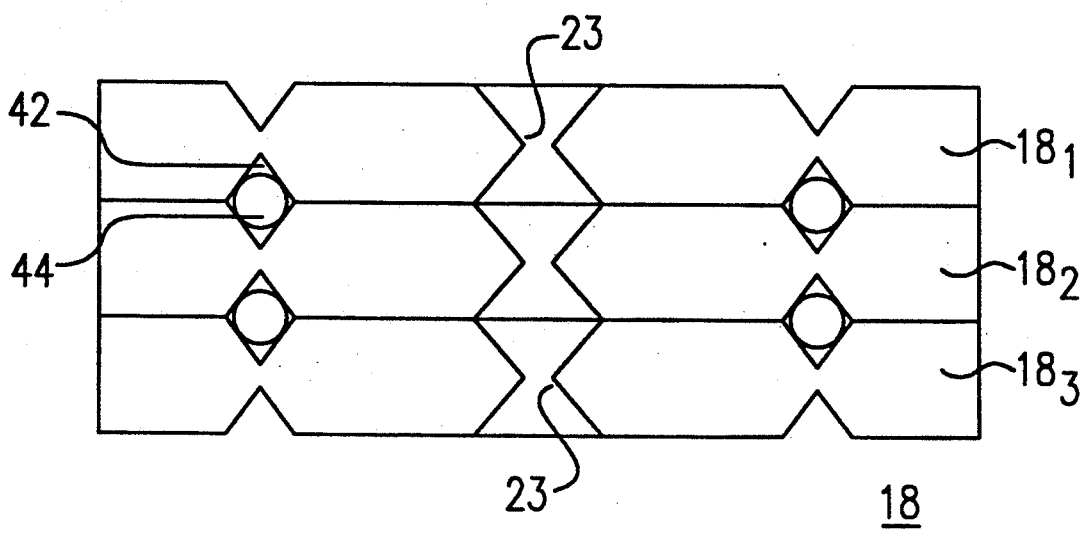
FIG. 5 illustrates an exemplary stack utilizing a plurality of members as illustrated in FIG. 4.

FIG. 5 illustrates an exemplary stack 18 comprising separate members $18_1$, $18_2$, $18_3$. A plurality of knife-edges 23, which may be formed when performing a single step, anisotropic etch upon silicon support members, are clearly visible in this view. The individual members forming stack 18 may be joined using the technique described above for joining stack 18 to member 12. That is, a plurality of detents 42 may be formed in each member $18_i$, as shown, with a plurality of spherical members 44 used to physically align the separate pieceparts. Thermionic or anodic bonding may be used to fix this attachment.

Figure 6:
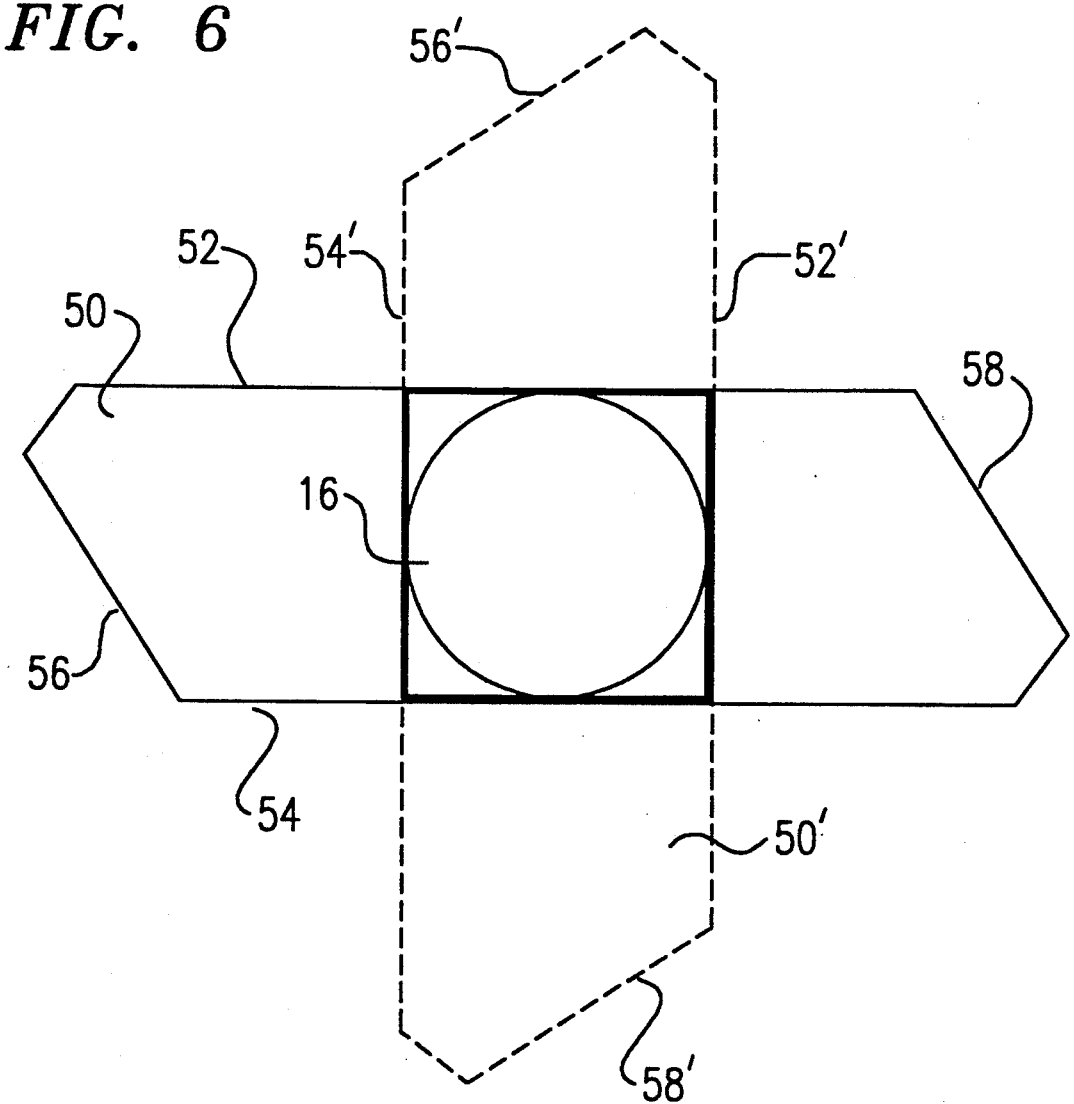
FIG. 6 illustrates an alternative stack arrangement.

An alternative stack arrangement, which avoids the formation of knife-edges, may be utilized in accordance with the teachings of the present invention. FIG. 6 illustrates a top plan view of an exemplary stack member including a viahole 50, etched in <110> silicon so as to form opposing parallel faces 52, 54 and opposing tapered faces 56, 58. A pair of such members may be stacked, with one member rotated orthogonal to the other such As shown, each individual members forming the stack is fabricated to include a viahole 50 comprising opposing parallel faces 52, 54 and opposing tapered faces 56, 58. A pair of such members may then be stacked, with one rotated orthogonal to the other, as shown by the via 50' illustrated in phantom in FIG. 6. The orthogonal displacement of the pair of members results in the such intersection of parallel faces 52, 54, 52' of viaholes 50 and 50' forming a "box", as indicated by the heavy line in FIG. 6. A fiber 16 may then be constrained within the dimension of the box as outlined by these parallel surfaces without the concern of a knife-edge formation.

Figure 7:
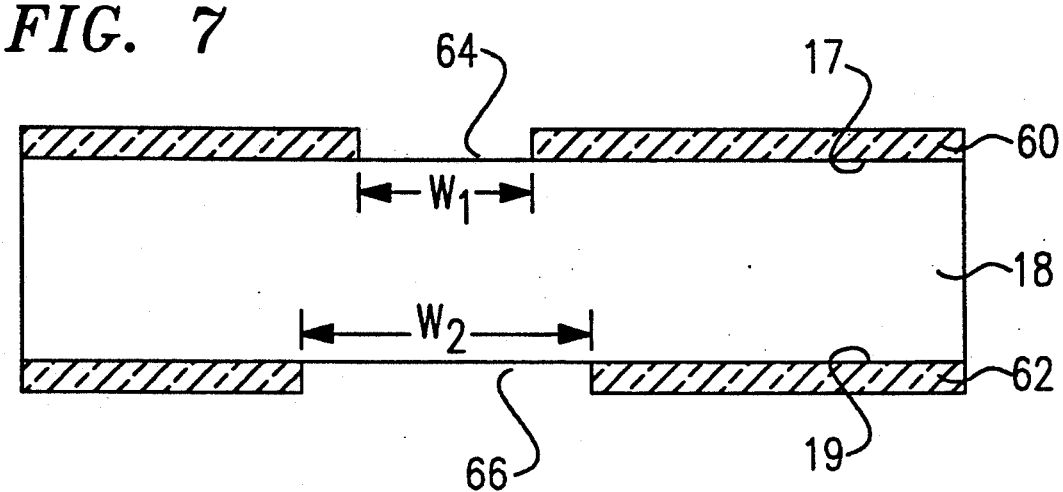
FIGS. 7-11 illustrate an exemplary fabrication process for forming a fiber mechanical stop within an exemplary silicon stack member.
Figure 8:
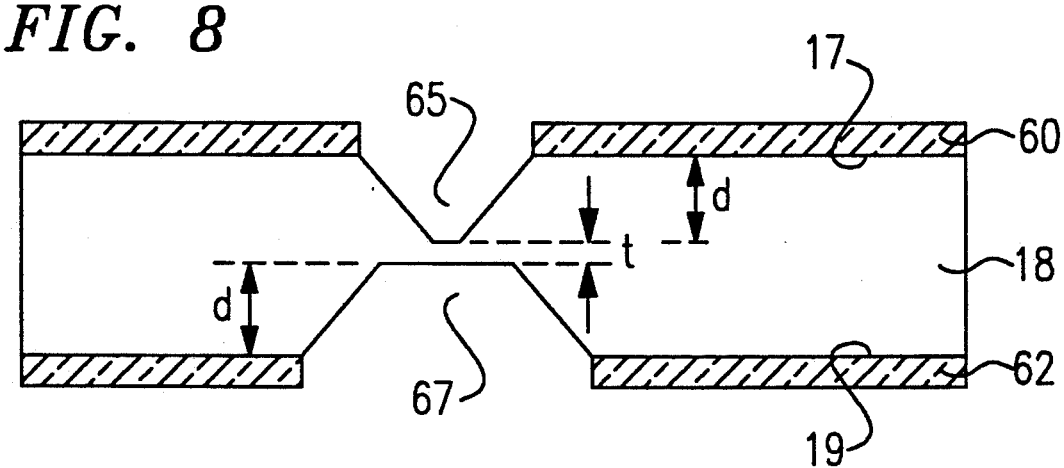
Figure 9:
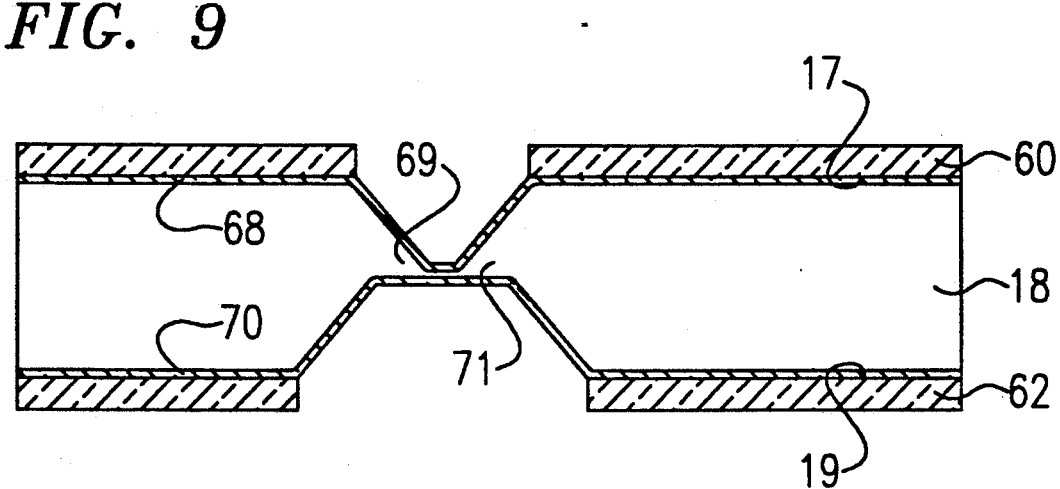
Figure 10:
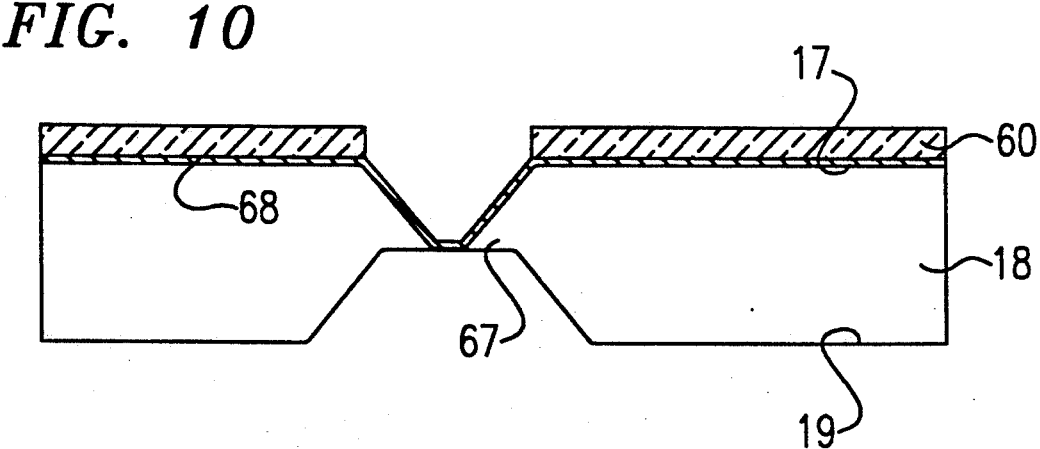
Figure 11:
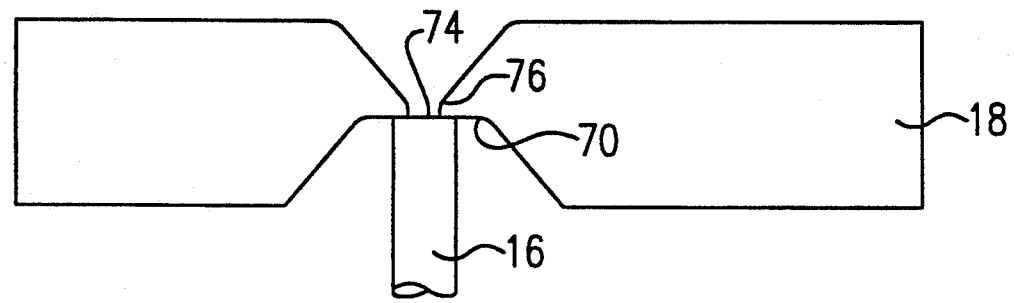

Alternatively, appropriate etching and masking steps may be used to avoid the formation of knife edges. Additionally, the fabrication process may be used to form a mechanical stop for a fiber endface within the stack. FIGS. 7–11 depict a particular series of such steps utilized with an exemplary silicon stack member 18. Referring to FIG. 7, oxide layers 60 and 62 are first grown over top and bottom surfaces 17 and 19 of member 18, respectively. Oxide layers 60 and 62 are subsequently patterned and etched to expose the underlying silicon in windows 64 and 66, where window 64 comprises a width $w_1$ somewhat less than the width $w_2$ of window 64, the difference in width calculated to form the desired fiber mechanical stop (as will be evident from the subsequent processing operations). The structure as depicted in FIG. 7 is then etched for a predetermined period of time so as to form openings 65 and 67, as shown in FIG. 8, where each is formed to a depth d, leaving a relatively small thickness t of silicon therebetween. Referring to FIG. 9, a first oxide layer 68 is subsequently grown over top surface 17, as well as etched opening 65, of member 18. Similarly, a second oxide layer 70 is grown over bottom surface 19 and etched opening 67. As is well-known in the silicon processing art, the formation of a thermal oxide layer involves the inward movement of the oxide at the silicon/oxide interface, as the underlying silicon consumed. Advantageously, the removal of the silicon during this process results in rounding knife edges 23 (see FIG. 3) and forming rounded corners 69, 71 as shown in FIG. 9. The rounded profiles of these areas thus reduces the problems (e.g., damage to fiber) associated with knife edges. Oxide layer 70 is subsequently removed, and via opening 67 is further etched until oxide layer 68 is reached, where oxide 68 will act as a natural etch stop. The structure at this point in the process is illustrated in FIG. 10. Upon removal of the remaining oxide material, stack member 18 is configured as shown in FIG. 11. As shown, a mechanical stop 74 for a fiber 16 is formed at the interface between the top and bottom etched regions, where the size of opening 76 is controlled (by controlling, for example, window widths, etchants, various etch parameters) so as to allow the core region of a fiber 16 to be coupled to the active area of an associated optical device (not shown).

Figure 12:
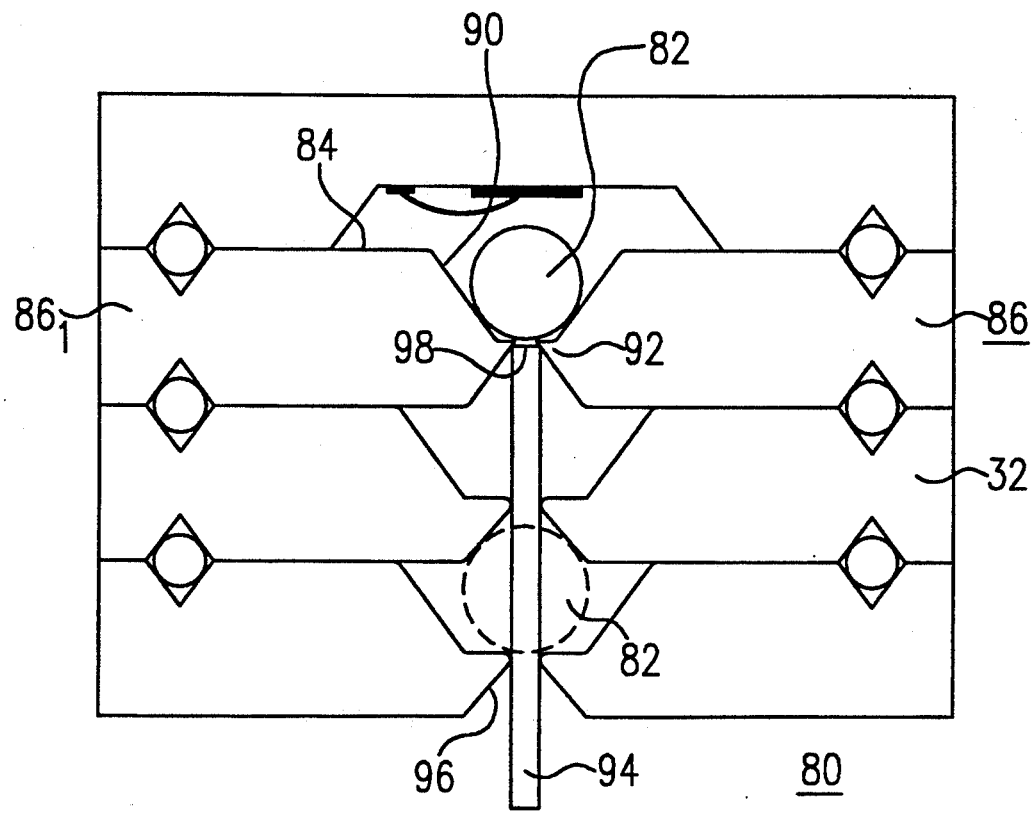
FIG. 12 illustrates an alternative embodiment of the present invention incorporating a spherical lens and fiber mechanical stop within the subassembly.

As mentioned above, a spherical coupling lens may be included in a subassembly formed in accordance with the teachings of the present invention. FIG. 12 illustrates an exemplary embodiment 80 of the present invention including such a lens. In particular, subassembly 80, as shown in FIG. 2, includes a lens 82 resting upon top surface 84 of a fiber stack 86, where the uppermost member $86_1$ of stack 86 is formed to include a recess 90 sufficient to capture lens 82. Additionally, member $86_1$ is processed to include a fiber stop 92, using the oxide growth and etch steps outlined above in association with FIGS. 7–11. Therefore, an optical fiber 94 may be inserted through an aperture 96 within stack 86 and the endface 98 of fiber 94 will be fixed by the location of mechanical stop 92. In an alternative arrangement, lens 82 may be positioned within aperture 96, below top surface 84, as shown in phantom in FIG. 12.

It is to be understood that the above-described embodiments of the present invention are exemplary only. For example, the various substrate members described above may be formed from a plastic material which is suitably molded utilizing either injection-molded or transfer-molded technologies. Some applications, particularly where cost is of a concern, plastic may be the material of choice. Indeed, the preferred alternative may utilize a silicon support member for the active device (for thermal management purposes) and a plastic stack (for cost reduction purposes). Further, various types of alignment fiducials, other than the above-described detent/sphere combination, may be used. For example, alignment grooves and ridges may be formed in the adjacent surfaces and interlocked to provide the physical attachment. Various other means will be apparent to those skilled in the art and are considered to fall within the scope of the present invention.

We claim:

1. An optical subassembly comprising
   a first substrate member including a top major surface for supporting an active optical device, said first member further including a plurality of alignment fiducials formed in said top major surface and positioned at predetermined locations with respect to said active optical device; and
   a plurality of substrate members disposed to form a stack defined as including a top major surface, each member comprising a viahole formed through the thickness thereof such that when the plurality of members are joined, the plurality of viaholes are aligned and form an aperture therethrough, said stack further comprising a plurality of fiducials formed in said top major surface and disposed to align with the first member fiducials such that when said stack is mated with said first member optical alignment between said active optical device and said aperture is achieved.

2. An optical subassembly as defined in claim 1 wherein the first member alignment fiducials comprise a plurality of detents formed in the top major surface and the stack alignment fiducials comprise a like plurality of detents formed in the stack top major surface wherein a plurality of spherical members may be disposed therebetween to provide mechanical attachment and alignment.

3. An optical subassembly as defined in claim 1 wherein the subassembly further comprises an optical fiber disposed through the aperture thereof.

4. An optical subassembly as defined in claim 1 wherein the subassembly further comprises a spherical lens member, said lens being supported by the aperture formed within the stack and aligned with the active optical device location on the first substrate member.

5. An optical subassembly as defined in claim 4 wherein the spherical lens member is supported on the top major surface of the stack.

6. An optical subassembly as defined in claim 4 wherein the spherical lens member is supported within the stack aperture.

7. An optical subassembly as defined in claim 1 wherein the stack further comprises a mechanical stop formed within the stack aperture, said mechanical stop utilized to fix the location of an optical fiber within the stack.

8. An optical subassembly as defined in claim 1 wherein the first substrate support member is formed to include a recess below the top major surface, said recess for supporting the active optical device.

9. An optical subassembly as defined in claim 1 wherein the first substrate member comprises a silicon substrate and the plurality of substrate members forming the stack comprise a plurality of silicon substrates.

10. An optical subassembly as defined in claim 9 wherein the first member alignment fiducials are formed by etching the top major surface of said first member.

11. An optical subassembly as defined in claim 10 wherein an anisotropic etch is utilized to form detents as the alignment fiducials.

12. An optical subassembly as defined in claim 9 wherein the first member comprises a recess formed by etching the top major surface thereof.

13. An optical subassembly as defined in claim 9 wherein the plurality of viaholes and alignment fiducials of the stack are formed by etching the appropriate surfaces of the separate silicon substrates forming said stack.

14. An optical subassembly as defined in claim 13 wherein the stack alignment fiducials are formed by anisotropically etching the top major surface thereof.

15. An optical subassembly as defined in claim 13 wherein the plurality of separate substrates forming the stack are joined utilizing a plurality of alignment fiducials etched in appropriate surfaces thereof.

16. An optical subassembly as defined in claim 9 wherein a selected silicon substrate member of the plurality of members comprising the stack is etched to include a mechanical stop within the associated viahole, the mechanical stop suitable for fixing the location of an optical fiber within the stack aperture.

17. An optical subassembly as defined in claim 1 wherein the first substrate member comprises a silicon substrate and the plurality of substrate members forming the stack comprise a plurality of plastic substrates.

18. An optical subassembly as defined in claim 17 wherein the plastic members comprise injection-molded plastic members.

19. An optical subassembly as defined in claim 17 wherein the plastic members comprise transfer-molded plastic members.

20. An optical subassembly as defined in claim 1 wherein the first substrate member comprises a plastic substrate and the plurality of substrate members forming the stack comprise a plurality of plastic substrates.

21. A method of forming an optical subassembly comprising the steps of:
  a) providing a first substrate member, said first member including a top major surface for supporting an active optical device;
  b) forming a plurality of alignment fiducials in the top major surface of said first member at predetermined locations with respect to said active optical device;
  c) providing a plurality of substrate members, each member including a top and bottom major surface;
  d) forming a viahole completely through each substrate member of said plurality of members provided in step c);
  e) forming a plurality of alignment fiducials in the top major surface of a selected member of the plurality of members, the alignment fiducials positioned to align with the alignment fiducials in the first substrate member formed in step b); and
  f) stacking the plurality of substrate members such that the plurality of viaholes align and form an aperture therethrough.

22. The method according to claim 21, wherein the method comprises the further steps of:
  g) attaching a semiconductor active optical device to the first substrate member;
  h) locating at least one optical device within the aperture formed in step f); and
  i) attaching the first substrate member to the stacked plurality of members such that the alignment fiducials are aligned and mated.

23. The method according to claim 22 wherein in performing the attaching step,

24. The method according to claim 22 wherein in performing the attaching step, the following steps are performed:
  1) forming a recess in the top major surface of the first substrate member; and
  2) disposing the semiconductor active optical device within the recess formed in step 1.

25. The method according to claim 22 wherein in performing the locating step, an optical fiber is located within the stack aperture.

26. The method according to claim 22 wherein in performing the locating step, a spherical lens is located within the stack aperture.

27. The method according to claim 22 wherein in performing the locating step, an optical fiber and a spherical lens are located in tandem within the stack aperture.

28. The method according to claim 21 wherein in performing the step of providing a first substrate member, a silicon substrate member is provided.

29. The method according to claim 21 wherein in performing the step of providing a first substrate member, a plastic substrate member is provided.

30. The method according to claim 21 wherein in performing the step of providing a plurality of substrate members, a plurality of silicon substrate members is provided.

31. The method according to claim 21 wherein in performing the step of providing a plurality of substrate members, a plurality of plastic substrate members is provided.

* * * * *